United States Patent
Li

(10) Patent No.: US 12,141,242 B2
(45) Date of Patent: Nov. 12, 2024

(54) IMAGE DATA CLASSIFICATION METHOD, COMPUTER DEVICE, AND READABLE STORAGE MEDIUM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Zi-Jie Li, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 663 days.

(21) Appl. No.: 17/411,243

(22) Filed: Aug. 25, 2021

(65) Prior Publication Data
US 2022/0067430 A1 Mar. 3, 2022

(30) Foreign Application Priority Data
Sep. 2, 2020 (CN) .......................... 202010912197.1

(51) Int. Cl.
G06F 18/40 (2023.01)
G06F 18/214 (2023.01)
G06F 18/24 (2023.01)
G06T 7/00 (2017.01)
G06V 10/22 (2022.01)
G06V 10/24 (2022.01)
G06V 10/40 (2022.01)

(52) U.S. Cl.
CPC ............ *G06F 18/40* (2023.01); *G06F 18/214* (2023.01); *G06F 18/24* (2023.01); *G06T 7/0002* (2013.01); *G06V 10/235* (2022.01); *G06V 10/248* (2022.01); *G06V 10/40* (2022.01); *G06T 2207/20081* (2013.01); *G06T 2207/30168* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 10,546,173 B2 * | 1/2020 | Hiroi | ......................... G06T 7/77 |
| 2021/0366166 A1 * | 11/2021 | Dwivedi | ................ G06N 20/20 |
| 2023/0230219 A1 * | 7/2023 | Mori | ..................... G06T 7/0004 |
| | | | 382/112 |

FOREIGN PATENT DOCUMENTS

| | | | | |
|---|---|---|---|---|
| CN | 101477630 A | | 7/2009 | |
| CN | 110858406 A | * | 3/2020 | ............ G06N 20/00 |
| CN | 112445224 A | * | 3/2021 | ........... G05D 1/0223 |
| CN | 113449750 A | * | 9/2021 | |
| WO | WO-2021245805 A1 | * | 12/2021 | ............ B41J 2/2132 |

\* cited by examiner

*Primary Examiner* — Mohammed Rachedine
(74) *Attorney, Agent, or Firm* — ScienBiziP, P.C.

(57) ABSTRACT

An image data classification method which includes distributing image data to n users is provided. N marks corresponding to the image data are collected by collecting the mark made by each of the n users on the image data. Once target marks are determined from the n marks and a rate of the target marks is calculated, a quality of the image data is determined according to the rate of the target marks.

17 Claims, 2 Drawing Sheets

IMAGE DATA CLASSIFICATION METHOD, COMPUTER DEVICE, AND READABLE STORAGE MEDIUM

FIELD

The present disclosure relates to image processing technology field, in particular to an image data classification method, computer device, and readable storage medium.

BACKGROUND

A field of machine learning usually needs to collect a large number of images as training samples, and learns based on feature points of the collected images. Each image needs to be marked with feature points in advance. Currently, the feature points of each image are manually marked. Once the feature points is wrongly marked, it affects results of machine learning.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
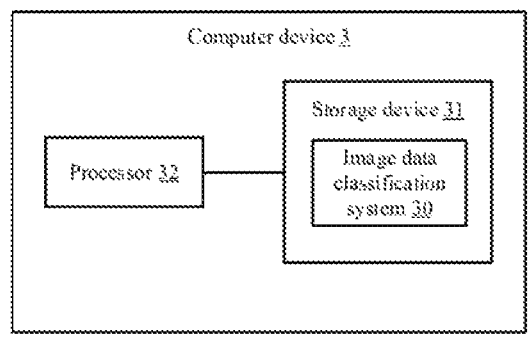
FIG. 1 illustrates a schematic diagram of a computer device according to one embodiment of the present disclosure.

FIG. 1 illustrates a schematic diagram of a computer device of the present disclosure.

In at least one embodiment, the computer device 3 includes a storage device 31, at least one processor 32. The storage device 31 and the at least one processor 32 are in electrical communication with each other.

Those skilled in the art should understand that the structure of the computer device 3 shown in FIG. 1 does not constitute a limitation of the embodiment of the present disclosure. The computer device 3 can further include more or less other hardware or software than that shown in FIG. 1, or the computer device 3 can have different component arrangements.

It should be noted that the computer device 3 is merely an example. If another kind of computer device can be adapted to the present disclosure, it should also be included in the protection scope of the present disclosure, and incorporated herein by reference In some embodiments, the storage device 31 may be used to store program codes and various data of computer programs. For example, the storage device 31 may be used to store an image data classification system 30 installed in the computer device 3 and implement completion of storing programs or data during an operation of the computer device 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different function. The at least one processor 32 includes one or more central processing units (CPUs), one or more microprocessors, one or more digital processing chips, one or more graphics processors, and various control chips. The at least one processor 32 is a control unit of the computer device 3. The at least one processor 32 uses various interfaces and. lines to connect various components of the computer device 3, and executes programs or modules or instructions stored in the storage device 31, and invokes data stored in the storage device 31 to perform various functions of the computer device 3 and to process data, for example, perform a function of classifying image data (for details, see the description of FIG. 3).

In this embodiment, the image data classification system 30 can include one or more modules. The one or more modules are stored in the storage device 31 and are executed by at least one processor (e.g. processor 32 in this embodiment), such that a function of classifying image data (for details, see the introduction to FIG. 3 below) is achieved.

Figure 2:
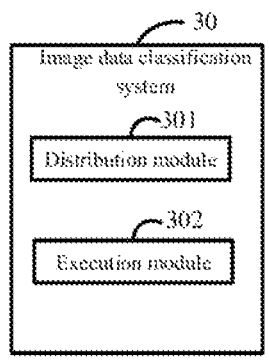
FIG. 2 shows one embodiment of modules of an image data classification system of the present disclosure.

In this embodiment, the image data classification system 30 can include a plurality of modules. Referring to FIG. 2, the plurality of modules includes a distribution module 301, an execution module 302. The module referred to in the present disclosure refers to a series of computer-readable instructions that can be executed by at least one processor (for example, the processor 32), and can complete functions, and can be stored in a storage device (for example, the storage device 31 of the computer device 3). In this embodiment, functions of each module will be described in detail with reference to FIG. 3.

Figure 3:
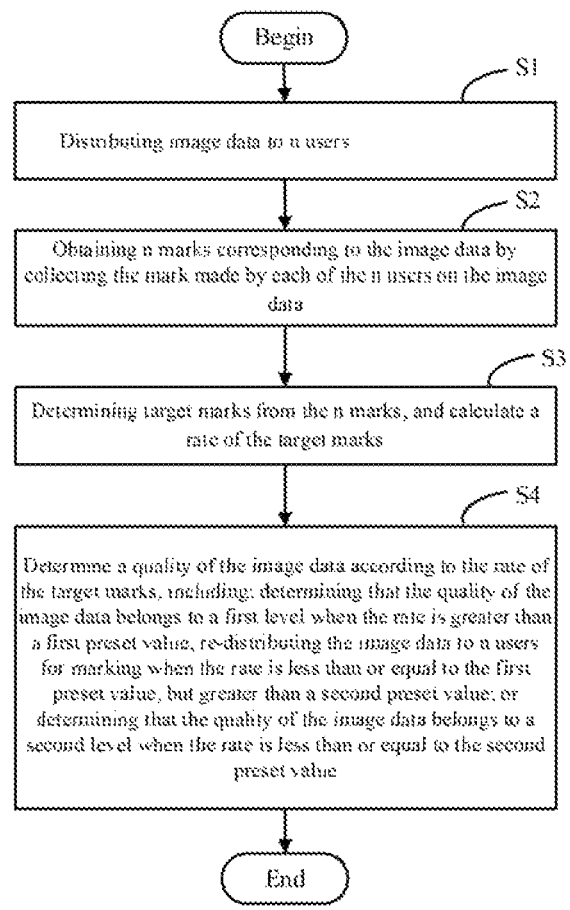
FIG. 3 shows a flow chart of one embodiment of an image data classification method of the present disclosure.

In this embodiment, an integrated unit implemented in a form of a software module can be stored in a non-transitory readable storage medium. The above modules include one or more computer-readable instructions. The computer device 3 or a processor implements the one or more computer-readable instructions, such that the method for classifying image data shown in FIG. 3 is achieved.

In a further embodiment, referring to FIG. 2, the at least one processor 32 can execute an operating system of the computer device 3, various types of applications (such as the image data classification system 30 described above), program codes, and the like.

In a further embodiment, the storage device 31 stores program codes of a computer program, and the at least one processor 32 can invoke the program codes stored in the storage device 31 to achieve related functions. For example, each module of the image data classification system 30 shown in FIG. 2 is program code stored in the storage device 31. Each module of the image data classification system 30 shown in FIG. 2 is executed by the at least one processor 32, such that the functions of the modules are achieved, and the purpose of classifying image data (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of classifying image data. Specifically, the computer-readable instructions executed by the at least one processor 32 to achieve the purpose of classifying image data is described in detail in FIG. 3 below.

It should be noted that, in other embodiments, the image data classification system 30 may also be implemented as an embedded system with a storage device, a processor, and other necessary hardware or software.

FIG. 3 is a flowchart of an image data classification method according to a preferred embodiment of the present disclosure.

In this embodiment, the image data classification method can be applied to the computer device 3. For the computer device 3 that requires classifying image data, the computer device 3 can be directly integrated with the function of classifying image data. The computer device 3 can also achieve the function of classifying image data by running a Software Development Kit (SDK).

FIG-. 3 shows a flow chart of one embodiment of an image data classification method. Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the distribution module 301 distributes image data ton users.

In this embodiment, the image data may be an image or a video. The user can also be named as marker, i.e., a user who makes a mark for the image data.

In this embodiment, the distribution module 301 can randomly distribute the image data to the n users. In other words, the n users can be selected randomly. In this embodiment, n is a positive integer, and can be set freely, but must be greater than 3.

In this embodiment, each of the n users can use a terminal device, such as a mobile phone, a computer, and other suitable device to receive the image data. Each terminal device (not shown in the FIG. 1) can be connected to the computer device 3 by wire or wirelessly. In this way, the n users can receive the image data using the terminal device.

For example, the image data is an image of a girl, n equals five, and the five users respectively use terminal 1, terminal 2, terminal 3, terminal 4, and terminal 5. Such that the distribution module 301 can distribute the image of the girl to the n users by sending the image of the girl to the terminal 1, terminal 2, terminal 3, terminal 4, and terminal 5.

At block S2, the execution module 302 obtains n marks corresponding to the image data by collecting the mark made by each of the n users on the image data.

In a first embodiment, the obtaining the n marks corresponding to the image data includes (a1)-(a6):

(a1) For the image data assigned to any one user of the n users, prompting the any one user to circle a designated object in the image data. The any one user can be one of the n users.

For example, the image data is an image P1 containing a dog and a wolf, the execution module 302 can control the terminal device used by the any one user to display a prompt of prompting the any one user to circle the dog in the image P1.

In one embodiment, in order to facilitate a recognition of an area occupied by the designated object circled by the any one user in the image data, the execution module 302 can further prompt the any one user to use a designated image processing tool such as a rectangular selection tool or a circular selection tool to circle the designated object in the image data, such that the any one user can use the designated image processing tool to circle the designated object in the image data according to the prompt.

(a2) Obtaining the image data in which the designated object has been circled by the any one user.

In one embodiment, the terminal device sends the image data in which the any one user has circled the designated object to the computer device, such that the execution module 302 can obtain the image data in which the designated object has circled by the any one user.

(a3) Recognizing an area occupied by the designated object in the image data.

In one embodiment, the execution module 302 can recognize the area occupied by the designated object in the image data by recognizing the designated image processing tool from the image data.

For example, assuming that the any one user uses the image processing tool such as the rectangle selection tool to circle the area of the dog in the image P1, then the execution module 302 can use an image recognition algorithm to identify a rectangle from the image P1, and set an area occupied by the rectangle in the image P1 as the area occupied by the designated object in the image data.

(a4) Obtaining image features of the area occupied by the designated object in the image data.

In this embodiment, the image features include, but are not limited to, color features, texture features, and shape features.

(a5) Setting the image features as a mark made by the any one user on the image data.

(a6) Obtaining the mark made by each of n−1 users from the n users except the any one user, according to (a1)-(a5), i.e., the method for obtaining the mark made by the any one user on the image data.

In a second embodiment, the obtaining the n marks corresponding to the image data includes (b1)-(b3):

(b1) For the image data distributed to any one user, generating an input interface, prompting the any one user to set a mark for the image data in the input interface, and the any one user is one of the n users.

For example, the image data is an image P2 containing an object, and the object is an orange, the execution module 302 can control the terminal device used by the any one user to display an input interface for the any one user to input the object of the image P2, such as input a name of the object.

(b2) Obtaining the mark set by the any one user for the image data from the input interface, such that the mark set by the any one user for the image data can be obtained.

(b3) Obtaining the mark made by each of n−1 users from the n users except the any one user, according to (b1)-(b2), i.e., the method of obtaining the mark made by the any one user on the image data.

In a third embodiment, the obtaining the n marks corresponding to the image data includes (c1)-(c4):

(c1) For the image data distributed to any one user, setting multiple options for the image data, wherein each of the multiple options corresponds to a mark, and different options correspond to different marks, the any one user is one of then users.

For example, the image data is an image P2 containing an object, and the object is an ahead portrait of a person, the execution module 302 can control the terminal device used by any one user to display a user interface on which multiple options are displayed. The mark corresponding to each option is one kind of moods. For example, the marks corresponding to the multiple options include a happy mood, a sad mood, an angry mood, and a surprised mood.

(c2) Prompting the any one user to make a selection from the multiple options based on the designated object of the image data.

(c3) Setting the option selected by the any one user as the mark made by the any one user on the image data.

(c4) Obtaining the mark made by each of n−1 users from the n users except the any one user, according to (c1)-(c3), i.e., the method of obtaining the mark made by the any one user on the image data.

At block S3, the execution module 302 determines target marks from the n marks, and calculates a rate of the target marks.

In an embodiment, the determining the target marks from the n marks and calculating the rate of the target marks includes (d1)-(d4):

(d1) Obtaining a plurality of groups by identifying same marks from the n marks and classifying the same marks into a same group.

It should be noted that, in the first embodiment, the identifying the same marks from the n marks includes: calculating a similarity between any two markers of the n marks based on image features corresponding to each of the any two marks: determining that the any two markers are the same markers when the similarity between the any two markers is greater than a preset value (for example, 95%); and determining that the any two markers are different markers when the similarity between the any two markers is less than or equal to the preset value.

In the second and third embodiments, the identifying the same marks from the n marks includes: identify the same marks from the n marks using a text matching algorithm.

(d2) Counting a total number of marks included in each of the plurality of groups.

(d3) Determining a target group from the plurality of groups, and setting the marks included in the target group as the target marks, the target group is a group corresponding to a largest total number of marks among the plurality of groups.

(d4) Calculating a rate C of the target markers based on the total number of the target markers included in the target group and a value of n, $C=(m/n)*100\%$, m represents the total number of the target marks included in the target group. represents the total number of the users.

At block S4, the execution module 302 determines a quality of the image data according to the rate of the target marks.

In one embodiment, the execution module 302 determines that the quality of the image data belongs to a first level (the first level represents that the image data is a high-quality image data) when the rate is greater than a first preset value (for example, 51%); re-distributing the image data to the n users for marking when the rate is less than or equal to the first preset value, but greater than a second preset value (for example, 34%); and determining that the quality of the image data belongs to a second level (the second level represents that the image data is a low-quality image data) when the rate is less than or equal to the second preset value.

In one embodiment, when the rate is less than or equal to the first preset value, but greater than the second preset value, the execution module 302 can re-distribute the image data to other users for marking, the other users can be different from the n users, or the other users includes some of the n users. A number of the other users can be equal to n, or can be greater than n.

In one embodiment, when the execution module 302 distributes the image data to the n users at block S1, the execution module 302 can stores an identification code (e.g., a mobile network code) of the terminal device used by each of the n users. Such that when the execution module 302 needs to re-distribute the image data to other users for marking, the execution module 302 can select other terminal devices based on the identification codes of the other terminal devices and the stored identification codes.

For example, in the first embodiment, it is assumed that the image P1 is sent to 100 users for marking, and the 100 users are required to mark the object in the image P1, the object in the image P1 is actually a dog. The execution module 302 obtains 100 marks that are marked by the 100 users, the 100 marks includes 46 marks labelling the object in the image P1 as dogs, 16 marks labeling the object in the image P1 as wolves, and 38 marks labeling the object in the image P1 as wolves and dogs. At block S3, the execution module 302 determines that the target mark is a dog from the above 100 marks, and calculates the rate of the target marks as 46%. Assuming that the first preset value is 51% and the second preset value is 34%, because the rate of the target marks 46% is less than the first preset value 51% and is greater than the second preset value 34%, the execution module 302 then re-distributes the image P1 to the 100 users for re-marking, re-determines the target marks and recalculates the rate of the target marks based on the 100 markers in the image P1 that are re-marked by the 100 users, and re-classifies the image P1 according to the recalculated rate of the target marks.

In one embodiment, when the image data is redistributed to the n users for marking, the execution module 302 calculates a total number of times of redistributing the image data by adding 1 to a current number of times that the image data is redistributed. When the total number of times of redistributing the image data reaches a preset value (for example, 2 or 3 times), and a current rate of the target marks is still less than or equal to the first preset value but greater than the second preset value, the execution module 302 determines that the quality of the image data belongs to the second level.

It should be noted that if there is a higher requirement on the quality of the image data, a magnitude of the first preset value and a magnitude of the second preset value can also be adjusted according to the user's input. For example, the first preset value may be adjusted to 67%, and the second preset value may be adjusted to 51%.

In this embodiment, the quality of each image data can be verified based on the blocks S1-S4, and all the image data that are classified into the first level can be used as training samples. As the training samples having the high quality are applied to machine learning, a recognition result of a model obtained under the machine learning is more in line with a consensus result of a general public.

For example, each image data is an image including a designated object such as a dog. After verifying the quality of each image data based on the blocks S1-S4, the execution module 302 can obtain multiple image data of which the quality belongs to the first level. The execution module 302 can use the multiple image data as the training sample to train the neural network to obtain an image recognition model. The image recognition model is used to recognize the designated object.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An image data classification method applied to a computer device, the method comprising:
   distributing image data to n users;
   obtaining n marks corresponding to the image data by collecting the mark made by each of the n users on the image data;
   determining target marks from the n marks, and calculating a rate of the target marks, comprising: obtaining a plurality of groups by identifying same marks from the n marks and classifying the same marks into a same group; counting a total number of marks comprised in each of the plurality of groups; determining a target group from the plurality of groups, and setting the marks comprised in the target group as the target marks, the target group is a group corresponding to a largest total number of marks among the plurality of groups; and calculating a rate C of the target markers based on the total number of the target markers comprised in the target group and a value of n, $C=(m/n)*100\%$, m represents the total number of the target marks comprised in the target group; and
   determining a quality of the image data according to the rate of the target marks.

2. The image data classification method according to claim 1, wherein the determining the quality of the image data according to the rate of the target marks comprises:
   determining that the quality of the image data belongs to a first level when the rate is greater than a first preset value;
   re-distributing the image data to n users for marking when the rate is less than or equal to the first preset value, but greater than a second preset value; or
   determining that the quality of the image data belongs to a second level when the rate is less than or equal to the second preset value.

3. The image data classification method according to claim 2, further comprising:
   calculating a total number of times of redistributing the image data by adding 1 to a current number of times that the image data is redistributed, when the image data is redistributed to users for marking;
   determining that the quality of the image data belongs to the second level, when the total number of times of redistributing the image data reaches a preset value, and a current rate of the target marks is still less than or equal to the first preset value but greater than the second preset value.

4. The image data classification method according to claim 1, wherein the obtaining n marks corresponding to the image data comprises:
   for the image data assigned to any one user of the n users, prompting the any one user to circle a designated object in the image data, the any one user is one of the n users;
   obtaining the image data in which the designated object has been circled by the any one user;
   recognizing an area occupied by the designated object in the image data;
   obtaining image features of the area occupied by the designated object in the image data;
   setting the image features as a mark made by the any one user on the image data; and
   obtaining the mark made by each of n−1 users from the n users except the any one user, according to the obtaining of the mark made by the any one user on the image data.

5. The image data classification method according to claim 1, wherein the obtaining n marks corresponding to the image data comprises:
   for the image data distributed to any one user, generating an input interface, prompting the any one user to set a mark for the image data in the input interface, the any one user is one of the n users;
   obtaining the mark set by the any one user for the image data from the input interface; and
   obtaining the mark made by each of n−1 users from the n users except the any one user, according to the obtaining of the mark made by the any one user on the image data.

6. The image data classification method according to claim 1, wherein the obtaining n marks corresponding to the image data comprises:
   for the image data distributed to any one user, setting a plurality of options for the image data, wherein each of the plurality of options corresponds to a mark, and different options correspond to different marks, the any one user is one of the n users;
   prompting the any one user to make a selection from the plurality of options based on the designated object of the image data;
   setting the option selected by the any one user as the mark made by the any one user on the image data; and
   obtaining the mark made by each of n−1 users from the n users except the any one user, according to the obtaining of the mark made by the any one user on the image data.

7. A computer device comprising:
   a storage device;
   at least one processor; and
   the storage device storing one or more programs, which when executed by the at least one processor, cause the at least one processor to:
   distribute image data to n users;
   obtain n marks corresponding to the image data by collecting the mark made by each of the n users on the image data;
   determine target marks from the n marks, and calculating a rate of the target marks, comprising: obtaining a plurality of groups by identifying same marks from the n marks and classifying the same marks into a same group; counting a total number of marks comprised in each of the plurality of groups; determining a target group from the plurality of groups, and setting the marks comprised in the target group as the target marks, the target group is a group corresponding to a largest total number of marks among the plurality of groups; and calculating a rate C of the target markers based on the total number of the target markers comprised in the target group and a value of n. C=(m/n)*100%, m represents the total number of the target marks comprised in the target group; and determine a quality of the image data according to the rate of the target marks.

8. The computer device according to claim 7, wherein the determining the quality of the image data according to the rate of the target marks comprises:

determining that the quality of the image data belongs to a first level when the rate is greater than a first preset value;

re-distributing the image data to n users for marking when the rate is less than or equal to the first preset value, but greater than a second preset value; or determining that the quality of the image data belongs to a second level when the rate is less than or equal to the second preset value.

9. The computer device according to claim 8, wherein the at least one processor is further caused to:

calculate a total number of times of redistributing the image data by adding 1 to a current number of times that the image data is redistributed, when the image data is redistributed to users for marking;

determine that the quality of the image data belongs to the second level, when the total number of times of redistributing the image data reaches a preset value, and a current rate of the target marks is still less than or equal to the first preset value but greater than the second preset value.

10. The computer device according to claim 7, wherein the obtaining n marks corresponding to the image data comprises:

for the image data assigned to any one user of the n users, prompting the any one user to circle a designated object in the image data, the any one user is one of the n users;

obtaining the image data in which the designated object has been circled by the any one user;

recognizing an area occupied by the designated object in the image data;

obtaining image features of the area occupied by the designated object in the image data;

setting the image features as a mark made by the any one user on the image data; and obtaining the mark made by each of n−1 users from the n users except the any one user, according to the obtaining of the mark made by the any one user on the image data.

11. The computer device according to claim 7, wherein the obtaining n marks corresponding to the image data comprises:

for the image data distributed to any one user, generating an input interface, prompting the any one user to set a mark for the image data in the input interface, the any one user is one of the n users;

obtaining the mark set by the any one user for the image data from the input interface; and obtaining the mark made by each of n−1 users from the n users except the any one user, according to the obtaining of the mark made by the any one user on the image data.

12. The computer device according to claim 7, wherein the obtaining n marks corresponding to the image data comprises:

for the image data distributed to any one user, setting a plurality of options for the image data, wherein each of the plurality of options corresponds to a mark, and different options correspond to different marks, the any one user is one of the n users;

prompting the any one user to make a selection from the plurality of options based on the designated object of the image data;

setting the option selected by the any one user as the mark made by the any one user on the image data; and obtaining the mark made by each of n−1 users from the n users except the any one user, according to the obtaining of the mark made by the any one user on the image data.

13. A non-transitory storage medium having instructions stored thereon, when the instructions are executed by a processor of a computer device, the processor is configured to perform an image data classification method, wherein the method comprises:

distributing image data to n users;

obtaining n marks corresponding to the image data by collecting the mark made by each of the n users on the image data;

determining target marks from the n marks, and calculating a rate of the target marks, comprising: obtaining a plurality of groups by identifying same marks from the n marks and classifying the same marks into a same group; counting a total number of marks comprised in each of the plurality of groups; determining a target group from the plurality of groups, and setting the marks comprised in the target group as the target marks, the target group is a group corresponding to a largest total number of marks among the plurality of groups; and calculating a rate C of the target markers based on the total number of the target markers comprised in the target group and a value of n, C=(m/n)*100%, m represents the total number of the target marks comprised in the target group; and determining a quality of the image data according to the rate of the target marks.

14. The non-transitory storage medium according to claim 13, wherein the determining the quality of the image data according to the rate of the target marks comprises:

determining that the quality of the image data belongs to a first level when the rate is greater than a first preset value;

re-distributing the image data to n users for marking when the rate is less than or equal to the first preset value, but greater than a second preset value; or determining that the quality of the image data belongs to a second level when the rate is less than or equal to the second preset value.

15. The non-transitory storage medium according to claim 14, wherein the method further comprises:

calculating a total number of times of redistributing the image data by adding 1 to a current number of times that the image data is redistributed, when the image data is redistributed to users for marking;

determining that the quality of the image data belongs to the second level, when the total number of times of redistributing the image data reaches a preset value, and a current rate of the target marks is still less than or equal to the first preset value but greater than the second preset value.

16. The non-transitory storage medium according to claim 13, wherein the obtaining n marks corresponding to the image data comprises:

for the image data assigned to any one user of the n users, prompting the any one user to circle a designated object in the image data, the any one user is one of the n users;

obtaining the image data in which the designated object has been circled by the any one user;

recognizing an area occupied by the designated object in the image data;

obtaining image features of the area occupied by the designated object in the image data;

setting the image features as a mark made by the any one user on the image data; and obtaining the mark made by each of n−1 users from the n users except the any one user, according to the obtaining of the mark made by the any one user on the image data.

17. The non-transitory storage medium according to claim 13, wherein the obtaining n marks corresponding to the image data comprises:

for the image data distributed to any one user, generating an input interface, prompting the any one user to set a mark for the image data in the input interface, the any one user is one of the n users;

obtaining the mark set by the any one user for the image data from the input interface; and obtaining the mark made by each of n−1 users from the n users except the any one user, according to the obtaining of the mark made by the any one user on the image data.

* * * * *